US012770275B2

(12) United States Patent
Yokoyama et al.

(10) Patent No.: US 12,770,275 B2
(45) Date of Patent: Oct. 20, 2026

(54) INFORMATION PROCESSING APPARATUS, INFORMATION PROCESSING METHOD, AND PROGRAM

(71) Applicant: Sony Group Corporation, Tokyo (JP)

(72) Inventors: Yuto Yokoyama, Saitama (JP); Taihei Meno, Chiba (JP); Ryo Fukazawa, Kanagawa (JP)

(73) Assignee: SONY GROUP CORPORATION, Tokyo (JP)

(*) Notice: Subject to any disclaimer, the term of this patent is extended or adjusted under 35 U.S.C. 154(b) by 302 days.

(21) Appl. No.: 18/294,557

(22) PCT Filed: Feb. 22, 2022

(86) PCT No.: PCT/JP2022/007125
§ 371 (c)(1),
(2) Date: Feb. 2, 2024

(87) PCT Pub. No.: WO2023/017627
PCT Pub. Date: Feb. 16, 2023

(65) Prior Publication Data

US 2025/0104254 A1 Mar. 27, 2025

(30) Foreign Application Priority Data

Aug. 10, 2021 (JP) ................................ 2021-130527

(51) Int. Cl.
*G06T 7/246* (2017.01)
*G06T 7/73* (2017.01)
*G06T 7/90* (2017.01)

(52) U.S. Cl.
CPC ................ *G06T 7/251* (2017.01); *G06T 7/74* (2017.01); *G06T 7/90* (2017.01);
(Continued)

(58) Field of Classification Search
CPC .. G06T 7/251; G06T 7/74; G06T 7/90; G06T 2207/10024; G06T 2207/20076; G06T 2207/30196; G06T 7/277; G06T 13/40
See application file for complete search history.

(56) References Cited

U.S. PATENT DOCUMENTS 9,478,033 B1 * 10/2016 Safreed .................. G06T 7/251
2016/0110885 A1 * 4/2016 Blasch ................ G06V 10/507
382/103

(Continued)

FOREIGN PATENT DOCUMENTS

JP 2014-044655 A 3/2014
JP 2020-136943 A 8/2020
JP 2021-033347 A 3/2021

OTHER PUBLICATIONS

Matsuda et al., "Feature Point Tracing Based on Linear Prediction Considering Time Continuity and Face Shape Constraint", Information Processing Society Research Report, Oct. 15, 02, 2013, pp. 145-149.

(Continued)

*Primary Examiner* — Kee M Tung
*Assistant Examiner* — Xiaoming Wei
(74) *Attorney, Agent, or Firm* — Paratus Law Group, PLLC

(57) ABSTRACT

It is desirable to provide a technology capable of more accurately estimating a motion of a three-dimensional model between a plurality of frames. Provided is an information processing apparatus including a movement amount calculation unit that calculates a movement amount associated with a first vertex included in a first frame on the basis of statistical processing according to color information associated with the first vertex, color information associated with a second vertex included in a second frame after the first
(Continued)

frame, three-dimensional coordinates associated with the first vertex, and three-dimensional coordinates associated with the second vertex.

20 Claims, 11 Drawing Sheets

(52) U.S. Cl.
CPC ............... *G06T 2207/10024* (2013.01); *G06T 2207/20076* (2013.01); *G06T 2207/30196* (2013.01)

(56) References Cited

U.S. PATENT DOCUMENTS

| | | | | |
|---|---|---|---|---|
| 2018/0012407 | A1* | 1/2018 | Chuang | G06T 13/40 |
| 2018/0144486 | A1* | 5/2018 | Yamamoto | G06T 7/174 |

OTHER PUBLICATIONS

Toshiyuki Sugicho et al., " An Automatic Creation of 3D Model by Tracking Feature Point", Journal of the Japanese Society of Intelligent Information and Fuzzy, Japanese, Japanese Society of Intelligent Information and Fuzzy, Oct. 15, 2007, pp. 579-591, vol. 19, No. 5.

* cited by examiner

| | NAME OF POLYGON | NAME OF VERTEX CONSTITUTING POLYGON |
|---|---|---|
| POLYGON | T0 | V0, V1, V2 |
| | T1 | V1, V3, V2 |
| | T2 | V0, V2, V4 |

| | NAME OF VERTEX | COORDINATES OF VERTEX | COLOR INFORMATION ON VERTEX |
|---|---|---|---|
| VERTEX | V0 | x0, y0, z0 | C0 |
| | V1 | x1, y1, z1 | C1 |
| | V2 | x2, y2, z2 | C2 |
| | V3 | x3, y3, z3 | C3 |
| | V4 | x4, y4, z4 | C4 |

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/007125 (filed on Feb. 22, 2022) under 35 U.S.C. § 371, which claims priority to Japanese Patent Application No. 2021-130527 (filed on Aug. 10, 2021), which are all hereby incorporated by reference in their entirety.

TECHNICAL FIELD

The present disclosure relates to an information processing apparatus, an information processing method, and a program.

BACKGROUND ART

In recent years, a technology for estimating a motion of a three-dimensional model between a plurality of frames is known. For example, a technology for estimating a motion of a three-dimensional model on the basis of the degree of matching between shapes of the three-dimensional model between a plurality of frames is disclosed (see, for example, Patent Document 1).

CITATION LIST

Patent Document

Patent Document 1: Japanese Patent Application Laid-Open No. 2020-136943

SUMMARY OF THE INVENTION

Problems to be Solved by the Invention

However, it is desirable to provide a technology capable of more accurately estimating a motion of a three-dimensional model between a plurality of frames.

Solutions to Problems

According to a certain aspect of the present disclosure, there is provided an information processing apparatus including a movement amount calculation unit that calculates a movement amount associated with a first vertex included in a first frame on the basis of statistical processing according to color information associated with the first vertex, color information associated with a second vertex included in a second frame after the first frame, three-dimensional coordinates associated with the first vertex, and three-dimensional coordinates associated with the second vertex.

In addition, according to another aspect of the present disclosure, there is provided an information processing method including calculating, by a processor, a movement amount associated with a first vertex included in a first frame on the basis of statistical processing according to color information associated with the first vertex, color information associated with a second vertex included in a second frame after the first frame, three-dimensional coordinates associated with the first vertex, and three-dimensional coordinates associated with the second vertex.

In addition, according to another aspect of the present disclosure, there is provided a program that causes a computer to function as an information processing apparatus including a movement amount calculation unit that calculates a movement amount associated with a first vertex included in a first frame on the basis of statistical processing according to color information associated with the first vertex, color information associated with a second vertex included in a second frame after the first frame, three-dimensional coordinates associated with the first vertex, and three-dimensional coordinates associated with the second vertex.

MODE FOR CARRYING OUT THE INVENTION

A preferred embodiment of the present disclosure will be described below in detail with reference to the accompanying drawings. Note that, in the present description and drawings, components having substantially the same functional configurations are denoted by the same reference signs, and redundant explanations will be therefore omitted.

In addition, in the present description and the drawings, a plurality of components having substantially the same or similar functional configurations will be sometimes distinguished by attaching different numbers after the same reference signs. However, in a case where it is not necessary to particularly distinguish each of a plurality of components having substantially the same or similar functional configurations, only the same reference signs will be mentioned. In addition, similar components of different embodiments will be sometimes distinguished by attaching different alphabets after the same reference signs. However, in a case where it is not necessary to particularly distinguish each of the similar components, only the same reference signs will be mentioned.

Note that the description will be given in the following order.

0. Outline
1. Details of Embodiment
1.1. Configuration Example of Apparatus
1.2. Functional Details
2. Various Modifications
3. Hardware Configuration Example
4. Conclusion

0. Outline

First, an outline of an embodiment of the present disclosure will be described.

In recent years, a volumetric capture technology has been known as an example of a technology for extracting three-dimensional data of an object (such as a person as an example) contained in imaging data on the basis of data (imaging data) obtained by continuous imaging along a time series by a plurality of cameras. The object for which the three-dimensional data is extracted can correspond to a three-dimensional model. Such a volumetric capture technology reproduces a three-dimensional moving image of the object from any viewpoint using the extracted three-dimensional data.

The three-dimensional data extracted by the volumetric capture technology is also referred to as volumetric data. The volumetric data is three-dimensional moving image data constituted by three-dimensional data (hereinafter, also referred to as a "frame") at each of a plurality of consecutive times. Here, an example of three-dimensional data extracted from imaging data in the volumetric capture technology will be described with reference to FIGS. 1 to 4.

Figure 1:
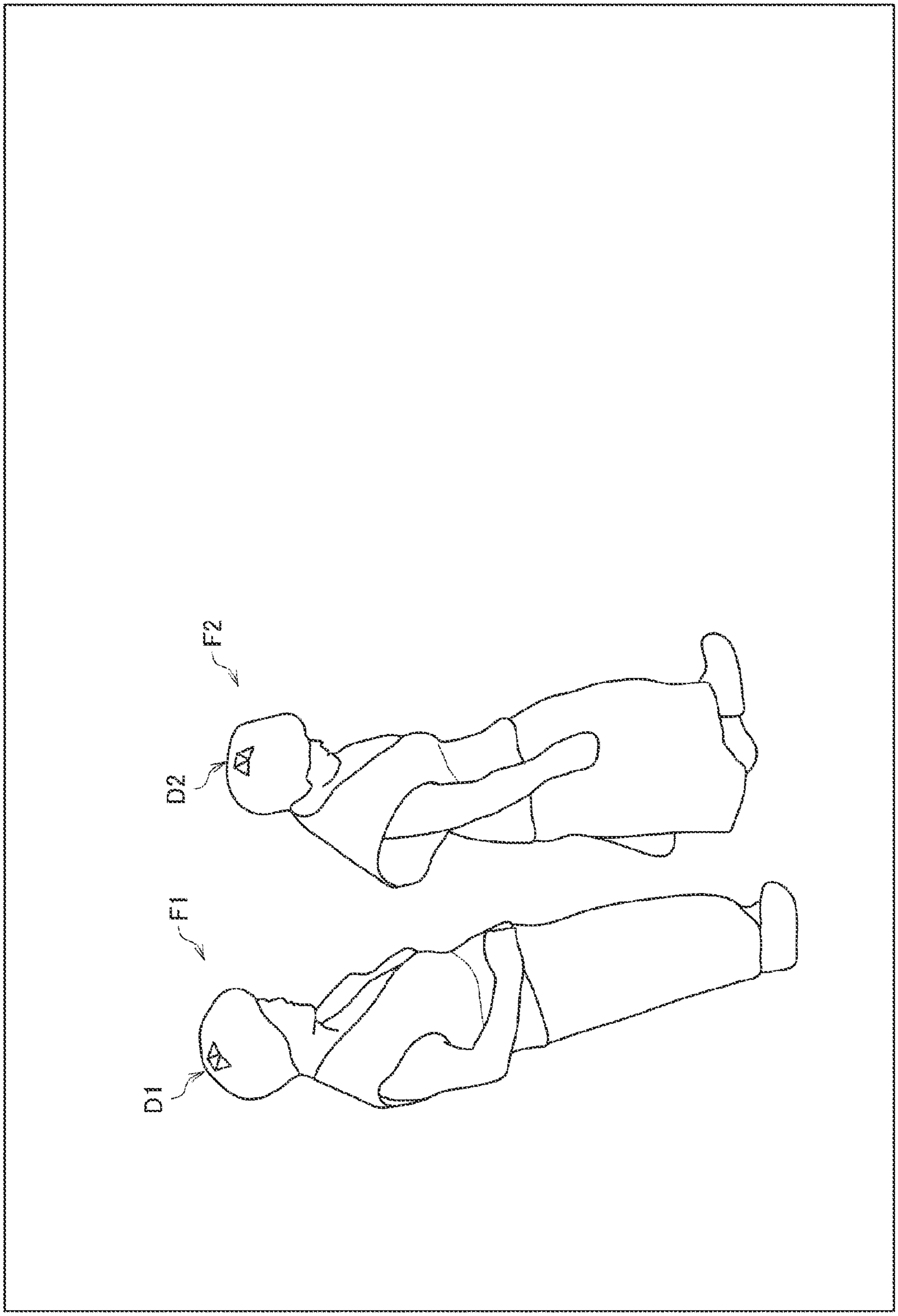
FIG. 1 is a diagram for explaining an example of three-dimensional data extracted from imaging data in a volumetric capture technology.

FIG. 1 is a diagram for explaining an example of three-dimensional data extracted from imaging data in the volumetric capture technology. Referring to FIG. 1, a three-dimensional model F1 in a certain frame is illustrated. In addition, referring to FIG. 1, a three-dimensional model F2 in the next frame is illustrated. The three-dimensional model F1 and the three-dimensional model F2 correspond to the same three-dimensional model at different times.

Note that FIG. 1 illustrates a person as an example of the three-dimensional model. However, the three-dimensional model according to the embodiment of the present disclosure can include other objects apart from a person. The three-dimensional model is a model indicated by three-dimensional data extracted from imaging data in the volumetric capture technology.

In addition, referring to FIG. 1, a polygon structure D1 indicating a part of the three-dimensional model F1 in detail is illustrated. Similarly, a polygon structure D2 indicating a part of the three-dimensional model F2 in detail is illustrated. That is, the three-dimensional model F1 and the three-dimensional model F2 are constituted by a polygon structure. Note that the polygon can mean a multiple-sided shape. In addition, in the example illustrated in FIG. 1, the polygon structure D1 and the polygon structure D2 are constituted by a combination of triangles (polygons having three vertices), but may be constituted by polygons (polygons having four or more vertices) apart from the triangles.

Figures 2, 3, 4:
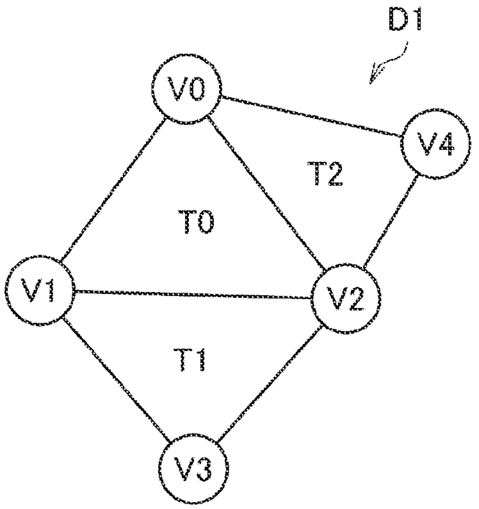
FIG. 2 is a diagram illustrating details of a polygon structure.
FIG. 3 is a diagram illustrating a configuration example of polygon data indicating polygons.
FIG. 4 is a diagram illustrating a configuration example of vertex data indicating vertices.

FIG. 2 is a diagram illustrating details of the polygon structure D1. Referring to FIG. 2, a diagram illustrating details of the polygon structure D1 illustrated in FIG. 1 is illustrated. The polygon structure D1 is constituted by a combination of a plurality of polygons.

FIG. 2 illustrates a polygon T0, a polygon T1, and a polygon T2 as an example of the plurality of polygons constituting the polygon structure D1. The polygon T0 is constituted by a vertex V0, a vertex V1, and a vertex V2. Similarly, the polygon T1 is constituted by the vertex V1, the vertex V2, and a vertex V3, and the polygon T2 is constituted by the vertex V0, the vertex V2, and a vertex V4.

FIG. 3 is a diagram illustrating a configuration example of polygon data indicating polygons. As illustrated in FIG. 3, the polygon data includes a name of a polygon and a name of a vertex constituting the polygon. The name of the polygon is information for uniquely identifying the polygon in the relevant frame. The name of the vertex constituting the polygon is information for uniquely identifying the vertex constituting the polygon in the relevant frame.

FIG. 4 is a diagram illustrating a configuration example of vertex data indicating vertices. As illustrated in FIG. 4, the vertex data includes a name of a vertex, coordinates of the vertex, and color information on the vertex. As described above, the name of the vertex is information for uniquely identifying the vertex in the relevant frame. The coordinates of the vertex are coordinates representing the position of the vertex. As an example, the coordinates of the vertex can be represented by three-dimensional coordinates (x coordinate, y coordinate, z coordinate).

The color information on the vertex is information indicating what color is applied to a surface (hereinafter, also referred to as a "mesh") formed by the vertex. For example, the color information may be represented by an RGB system, but may be represented by any system. As an example, the color information on the mesh formed by the vertex V0, the vertex V1, and the vertex V2 (that is, the color information on the mesh inside the polygon T0) is determined on the basis of the color information on the vertex V0, the color information on the vertex V1, and the color information on the vertex V2.

The volumetric data, which has the configuration as described above, is independent between frames and does not have information indicating a correlation relationship between positions of the same three-dimensional model in a plurality of consecutive frames. For this reason, there is a concern that it is difficult to accurately grasp the motion of the three-dimensional model. As an example, it is not easily feasible to grasp to which polygon a polygon present near a certain part (such as a hand as an example) in a certain frame has moved in the next frame.

As an example of the existing technology, there is also a technology of detecting the position of a part of a human body from imaging data, for example. However, in such an existing technology, the position of an object apart from a part of a human body (such as clothes and props, as an example) is not easily detected. Furthermore, as another existing technology, there is also a technology of detecting the position of a marker attached in advance from imaging data, for example. However, in such an existing technology, the position of an object to which the marker is difficult to allocate is not easily detected.

Note that further divergence between the technology according to the embodiment of the present disclosure and other existing technologies will be described in more detail at the end of the present description. In addition, the following events can occur from the fact that the motion of the three-dimensional model is not accurately grasped.

That is, there is a case where an alteration to add a visual object (hereinafter, also referred to as an "effect") is performed on the three-dimensional model. At this time, if the motion of the three-dimensional model is not accurately grasped, the position of the effect that changes along with the motion of the three-dimensional model is also not allowed to be accurately estimated. If the position of the effect is not accurately estimated, a creator will have to manually determine the position of the effect, but if the creator has to determine all the positions of the effects, a large workload will be put on the creator. In particular, the load put on a creator for the work of causing the effect to follow the hand or foot or a prop tends to be large.

Thus, the embodiment of the present disclosure mainly proposes a technology capable of more accurately estimating a motion of a three-dimensional model between a plurality of frames. In more detail, in the embodiment of the present disclosure, a movement amount associated with a vertex between frames is estimated on the basis of the color information associated with the vertex between frames. Here, the movement amount can include at least one of a direction of movement or a distance of movement. The direction of movement and the distance of movement can correspond to a movement vector (hereinafter, also referred to as an "optical flow").

Note that, generally, the optical flow is used in a two-dimensional moving image. In the two-dimensional moving image, generally, a movement amount of each pixel between frames is calculated as a two-dimensional optical flow. In the embodiment of the present disclosure, a three-dimensional optical flow is calculated, but the two-dimensional optical flow and the three-dimensional optical flow have divergence in the following points.

That is, in the two-dimensional moving image, the relative position between the subject and the light source does not change, whereas the camera performs motions. On the other hand, in the three-dimensional moving image, the relative position between the light source and the camera does not change, whereas the subject performs motions. Furthermore, the two-dimensional moving image is divided into each pixel by a grid, but in the three-dimensional moving image, the positions of vertices and polygons are random. Thus, in the embodiment of the present disclosure, the three-dimensional optical flow is calculated by a calculation approach different from the calculation approach for the two-dimensional optical flow.

An outline of the embodiment of the present disclosure has been described above.

1. Details of Embodiment

Next, the embodiment of the present disclosure will be described in detail.

(1.1. Configuration Example of Apparatus)

First, a configuration example of an information processing apparatus according to the embodiment of the present disclosure will be described.

Figure 5:
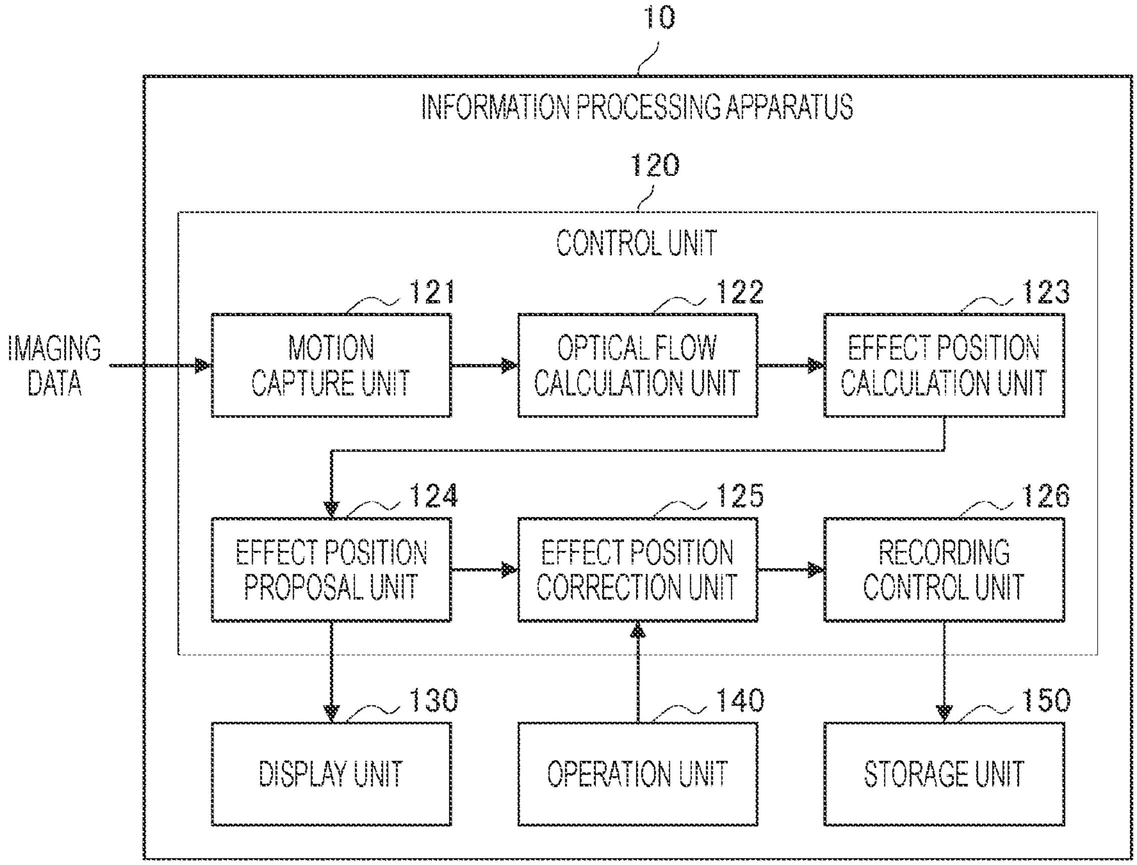
FIG. 5 is a diagram for explaining a configuration example of an information processing apparatus according to an embodiment of the present disclosure.

FIG. 5 is a diagram for explaining a configuration example of an information processing apparatus according to the embodiment of the present disclosure. As illustrated in FIG. 5, an information processing apparatus 10 according to the embodiment of the present disclosure is implemented by a computer and includes a control unit 120, a display unit 130, an operation unit 140, and a storage unit 150.

(Control Unit 120)

For example, the control unit 120 may be constituted by one or a plurality of central processing units (CPUs; central arithmetic processing apparatuses) or the like. In a case where the control unit 120 is constituted by a processing apparatus such as a CPU, this processing apparatus may be constituted by an electronic circuit. The control unit 120 can be implemented by such a processing apparatus executing a program.

As illustrated in FIG. 5, the control unit 120 includes a motion capture unit 121, an optical flow calculation unit 122, an effect position calculation unit 123, an effect position proposal unit 124, an effect position correction unit 125, and a recording control unit 126. Details of the motion capture unit 121, the optical flow calculation unit 122, the effect position calculation unit 123, the effect position proposal unit 124, the effect position correction unit 125, and the recording control unit 126 will be described later.

(Display Unit 130)

The display unit 130 presents various kinds of information to the creator under the control of the control unit 120. For example, the display unit 130 can include a display. The type of the display is not limited. For example, the display included in the display unit 130 may be a liquid crystal display (LCD), an organic electro-luminescence (EL) display, a plasma display panel (PDP), or the like.

(Operation Unit 140)

The operation unit 140 has a function of accepting an operation input by the creator of a three-dimensional video. For example, the operation unit 140 can be constituted by a mouse and a keyboard. Alternatively, the operation unit 140 may be constituted by a touch panel, may be constituted by a button, or may be constituted by an input device such as a microphone.

(Storage Unit 150)

The storage unit 150 is a recording medium that has a configuration including a memory and, for example, stores a program to be executed by the control unit 120 and the data necessary for executing this program. In addition, the storage unit 150 temporarily stores data for arithmetic operations by the control unit 120. The storage unit 150 is constituted by a magnetic storage unit device, a semiconductor storage device, an optical storage device, a magneto-optical storage device, or the like.

A configuration example of the information processing apparatus 10 according to the embodiment of the present disclosure has been described above.

(1.2. Functional Details)

Next, functional details of the information processing apparatus 10 according to the embodiment of the present disclosure will be described. In the embodiment of the present disclosure, a plurality of cameras is installed around a three-dimensional object (such as a person), and the three-dimensional object is imaged by the plurality of cameras. The plurality of cameras is connected to the information processing apparatus 10, and data (imaging data) obtained by continuous imaging along a time series by the plurality of cameras is transmitted to the information processing apparatus 10.

(Motion Capture Unit 121)

The motion capture unit 121 extracts three-dimensional data of a three-dimensional object on the basis of the imaging data by the plurality of cameras. This ensures that three-dimensional data at each of a plurality of consecutive times is obtained as a frame. The motion capture unit 121 continuously outputs a plurality of frames obtained in this manner to the optical flow calculation unit 122.

Note that the motion capture unit 121 may output the plurality of frames to the optical flow calculation unit 122 in real time or may output the plurality of frames to the optical flow calculation unit 122 on demand in accordance with a request from the optical flow calculation unit 122. Each frame includes three-dimensional coordinates associated with a vertex and color information associated with the vertex.

(Optical Flow Calculation Unit 122)

The optical flow calculation unit 122 functions as a movement amount calculation unit that calculates a movement vector associated with a vertex included in a target frame (hereinafter, also represented as a "frame N") among two consecutive frames, as an optical flow associated with the vertex, on the basis of statistical processing according to the color information associated with the vertex included in the frame N, the three-dimensional coordinates associated with the vertex included in the target frame, the color information associated with a vertex included in a frame subsequent to the frame N (hereinafter, also represented as a "frame N+1"), and the three-dimensional coordinates associated with the vertex included in the frame N+1.

This enables to more accurately estimate a motion of the three-dimensional model between the plurality of frames. Note that the frame N can correspond to an example of a first frame. The frame N+1 can correspond to an example of a second frame. The vertex included in the frame N can correspond to an example of a first vertex. The vertex included in the frame N+1 can correspond to an example of a second vertex.

In addition, as the color information, any one of hue, lightness, or saturation, which are three attributes of color, may be used. However, it is desirable to use, as the color information, the hue that gets a relatively small influence from the relative position between the three-dimensional object and the light source, intensity of light emitted from the light source, or the like. That is, the color information associated with the vertex included in the frame N may include the hue, and the color information associated with the vertex included in the frame N+1 may include the hue.

Note that, in the embodiment of the present disclosure, a case where the optical flow is calculated on a mesh basis will be mainly assumed. However, the optical flow may be calculated on a vertex basis. That is, in the embodiment of the present disclosure, a case where the optical flow is calculated using the three-dimensional coordinates of the mesh and the color information on the mesh will be mainly assumed. However, the three-dimensional coordinates of the vertex and the color information on the vertex may be used to calculate the optical flow.

In more detail, in the embodiment of the present disclosure, a case where the color information associated with the vertex included in the frame N is the color information on a mesh (first surface) formed by this vertex, and the color information associated with the vertex included in the frame N+1 is the color information on a mesh (second surface) formed by this vertex will be mainly assumed.

In addition, in the embodiment of the present disclosure, a case where the three-dimensional coordinates associated with the vertex included in the frame N are the three-dimensional coordinates of a mesh formed by this vertex, and the three-dimensional coordinates associated with the vertex included in the frame N+1 are the three-dimensional coordinates of a mesh formed by this vertex will be mainly assumed.

Then, in the embodiment of the present disclosure, a case where the movement amount associated with the vertex included in the frame N is the movement amount of a mesh formed by this vertex will be mainly assumed.

However, as also will be described later in a modification, the color information associated with the vertex included in the frame N may be the color information on this vertex, and the color information associated with the vertex included in the frame N+1 may be the color information on this vertex. Then, the three-dimensional coordinates associated with the vertex included in the frame N may be the three-dimensional coordinates of this vertex, and the three-dimensional coordinates associated with the vertex included in the frame N+1 may be the three-dimensional coordinates of this vertex. At this time, the movement amount associated with the vertex included in the frame N may be the movement amount of this vertex.

The optical flow calculation unit 122 obtains the color information on each vertex in the frame N and also obtains three-dimensional coordinates of each vertex in the frame N from the frame N obtained by the motion capture unit 121. Furthermore, the optical flow calculation unit 122 obtains the color information on each vertex in the frame N+1 and also obtains three-dimensional coordinates of each vertex in the frame N+1 from the frame N+1.

The optical flow calculation unit 122 calculates the color information on each mesh in the frame N on the basis of the color information on each vertex obtained from the frame N. Furthermore, the optical flow calculation unit 122 calculates the three-dimensional coordinates of each mesh in the frame N on the basis of the three-dimensional coordinates of each vertex obtained from the frame N. Similarly, the optical flow calculation unit 122 calculates the color information on each mesh in the frame N+1 on the basis of the color information on each vertex obtained from the frame N+1. Furthermore, the optical flow calculation unit 122 calculates the three-dimensional coordinates of each mesh in the frame N+1 on the basis of the three-dimensional coordinates of each vertex obtained from the frame N+1.

Note that the color information on the mesh can be calculated by merging (for example, averaging) the color information of each of the three vertices forming this mesh. In addition, the three-dimensional coordinates of the mesh can be calculated by the coordinates of the center of gravity of the three-dimensional coordinates of each of the three vertices forming this mesh.

Figure 6:
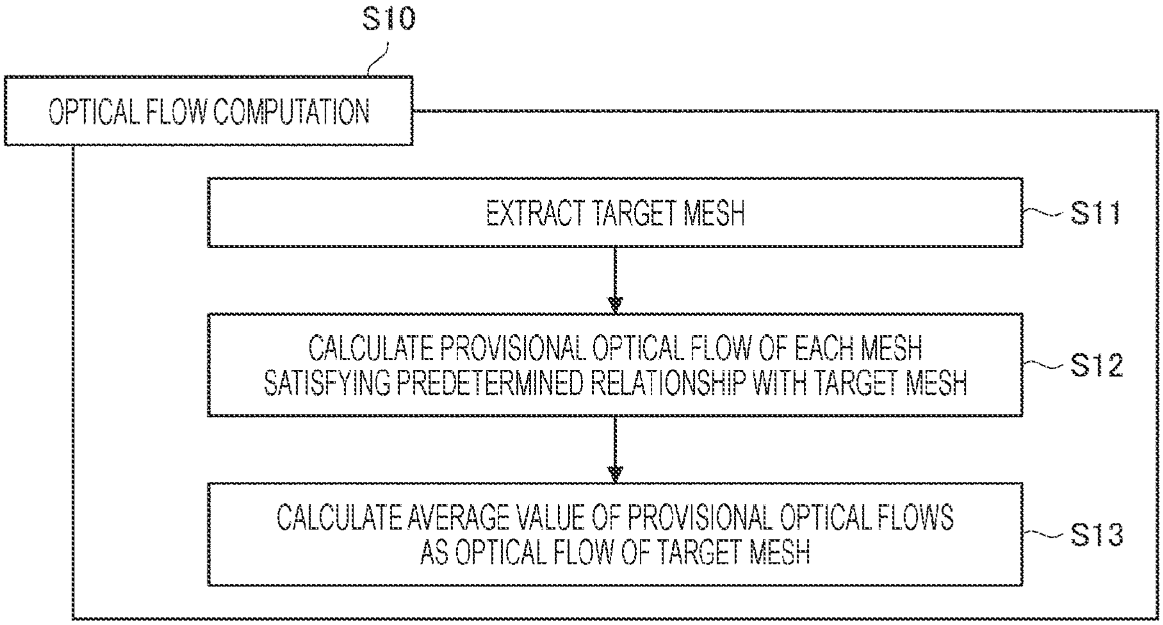
FIG. 6 is a flowchart illustrating an example of computation of an optical flow.
Figure 7:
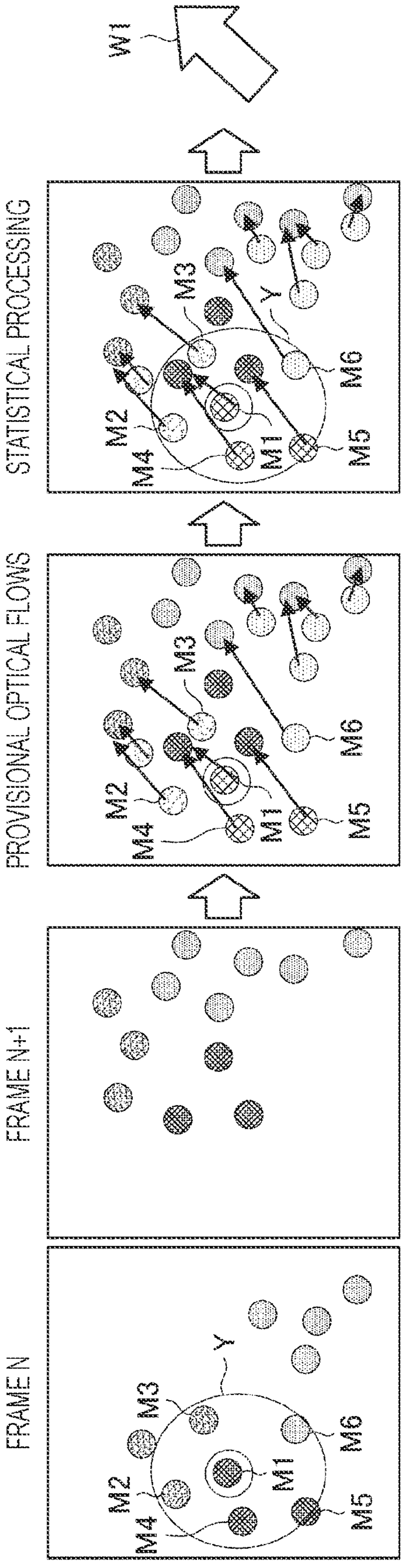
FIG. 7 is a diagram for explaining an example of computation of an optical flow.

FIG. 6 is a flowchart illustrating an example of computation of the optical flow. FIG. 7 is a diagram for explaining an example of computation of the optical flow. An example of optical flow computation S10 will be described in detail with reference to FIGS. 6 and 7.

As illustrated in FIG. 6, the optical flow calculation unit 122 extracts a mesh for which the optical flow is to be calculated, as a target mesh, from among respective meshes obtained from the frame N (S11).

Referring to FIG. 7, the "frame N" and the "frame N+1" are illustrated. Each circle included in each of the "frame N" and the "frame N+1" indicates a mesh included in the relevant frame. The pattern of each mesh is correlated with the color information on the mesh. Accordingly, the meshes having the same pattern as each other have the same color information. On the other hand, the meshes having different patterns from each other have different kinds of color information. For example, it is supposed that a target mesh M1 is extracted from the frame N.

Next, as illustrated in FIG. 6, the optical flow calculation unit 122 extracts one or a plurality of meshes satisfying a predetermined relationship with the target mesh M1, as meshes (third surfaces) in a statistical processing range of the target mesh M1, from among a plurality of meshes included in the frame N+1. Then, the optical flow calculation unit 122 calculates a provisional optical flow of each mesh in the statistical processing range (S12).

Here, the mesh satisfying the predetermined relationship with the target mesh M1 may be a mesh whose distance from the target mesh M1 is smaller than a second threshold value (denoted as Y cm). For example, Y cm may be 6 cm or the like, may be a fixed value, or may be variable. In the "frame N" illustrated in FIG. 7, a set of three-dimensional coordinates separated by Y cm from the three-dimensional coordinates of the mesh M1 is illustrated as a range Y.

In more detail, the optical flow calculation unit 122 extracts one or a plurality of meshes having three-dimensional coordinates whose distance from the three-dimensional coordinates of the target mesh M1 is smaller than Y cm, as meshes in the statistical processing range of the target mesh M1, from among a plurality of meshes included in the frame N+1. Here, it is supposed that the meshes M1 to M6 are extracted as the meshes in the statistical processing range of the target mesh M1.

Next, the optical flow calculation unit 122 extracts one or a plurality of meshes having three-dimensional coordinates whose distance from the three-dimensional coordinates of the mesh M1 in the statistical processing range is smaller than a first threshold value (denoted as X cm). X cm may be a fixed value or may be variable. Note that X cm that is the first threshold value may be the same as or different from above-described Y cm that is the second threshold value.

Then, the optical flow calculation unit 122 extracts a mesh with the color information having the smallest difference from the color information on the mesh M1 in the statistical processing range, as a movement destination candidate mesh of the mesh M1 in the statistical processing range, from among the extracted one or more meshes. The optical flow calculation unit 122 calculates a movement vector from the three-dimensional coordinates of the mesh M1 in the statistical processing range to the three-dimensional coordinates of the extracted movement destination candidate mesh, as a provisional optical flow of the mesh M1.

Similarly, the optical flow calculation unit 122 extracts a movement destination candidate mesh (fourth surface) of each of the meshes M2 to M6 in the statistical processing range. Then, the optical flow calculation unit 122 calculates a provisional optical flow of each of the meshes M2 to M6 in the statistical processing range.

The "provisional optical flows" illustrated in FIG. 7 are a diagram illustrating the meshes in the "frame N" and the meshes in the "frame N+1" illustrated in FIG. 7 in an overlapping manner. However, in the "provisional optical flows", the patterns given to the meshes in the frame N are illustrated to be lighter than the patterns given to the meshes in the frame N+1. Furthermore, in the "provisional optical flows", the provisional optical flow of each mesh in the frame N is indicated by an arrow.

Next, the optical flow calculation unit 122 calculates the optical flow of the target mesh M1 on the basis of the statistical processing for the provisional optical flows of the respective meshes M1 to M6 in the statistical processing range. By performing the statistical processing for the provisional optical flows in this manner, an error included in the provisional optical flows can be removed.

In the embodiment of the present disclosure, a case where processing of calculating an average value is used as an example of the statistical processing will be mainly described. That is, the optical flow calculation unit 122 calculates the average value of the provisional optical flows of the respective meshes M1 to M6 in the statistical processing range, as the optical flow of the target mesh M1 (S13). An optical flow W1 illustrated in FIG. 7 is the optical flow of the target mesh M1.

However, the statistical processing is not limited to the processing of calculating the average value. For example, the statistical processing may be processing of extracting a mode value. Note that whether to use the processing of calculating the average value or the processing of extracting the mode value as the statistical processing may be appropriately determined according to the characteristics or the like of the volumetric data.

The optical flow calculation unit 122 calculates the optical flows of all the meshes included in the frame N by an approach similar to the approach for calculating the optical flow of the target mesh M1. However, the meshes for which the optical flows are to be calculated are not necessarily all the meshes included in the frame N and may be some meshes included in the frame N.

For example, the optical flow calculation unit 122 may adjust the meshes for which the optical flows are to be calculated, according to the purpose of use or the like of the optical flow. For example, there can be a case where the optical flow of a mesh at a position lower than a predetermined height is not used. Thus, the optical flow calculation unit 122 may exclude a mesh at a position lower than a predetermined height from the meshes for which the optical flows are to be calculated.

Alternatively, in the optical flow calculation unit 122, as the number of vertices or meshes included in the frame N per unit volume is smaller, the error included in the provisional optical flows tends to be larger. Accordingly, the optical flow calculation unit 122 may increase the proportion of the meshes for which the optical flows are to be calculated, as the number of vertices or meshes included in the frame N per unit volume is smaller.

Figure 8:
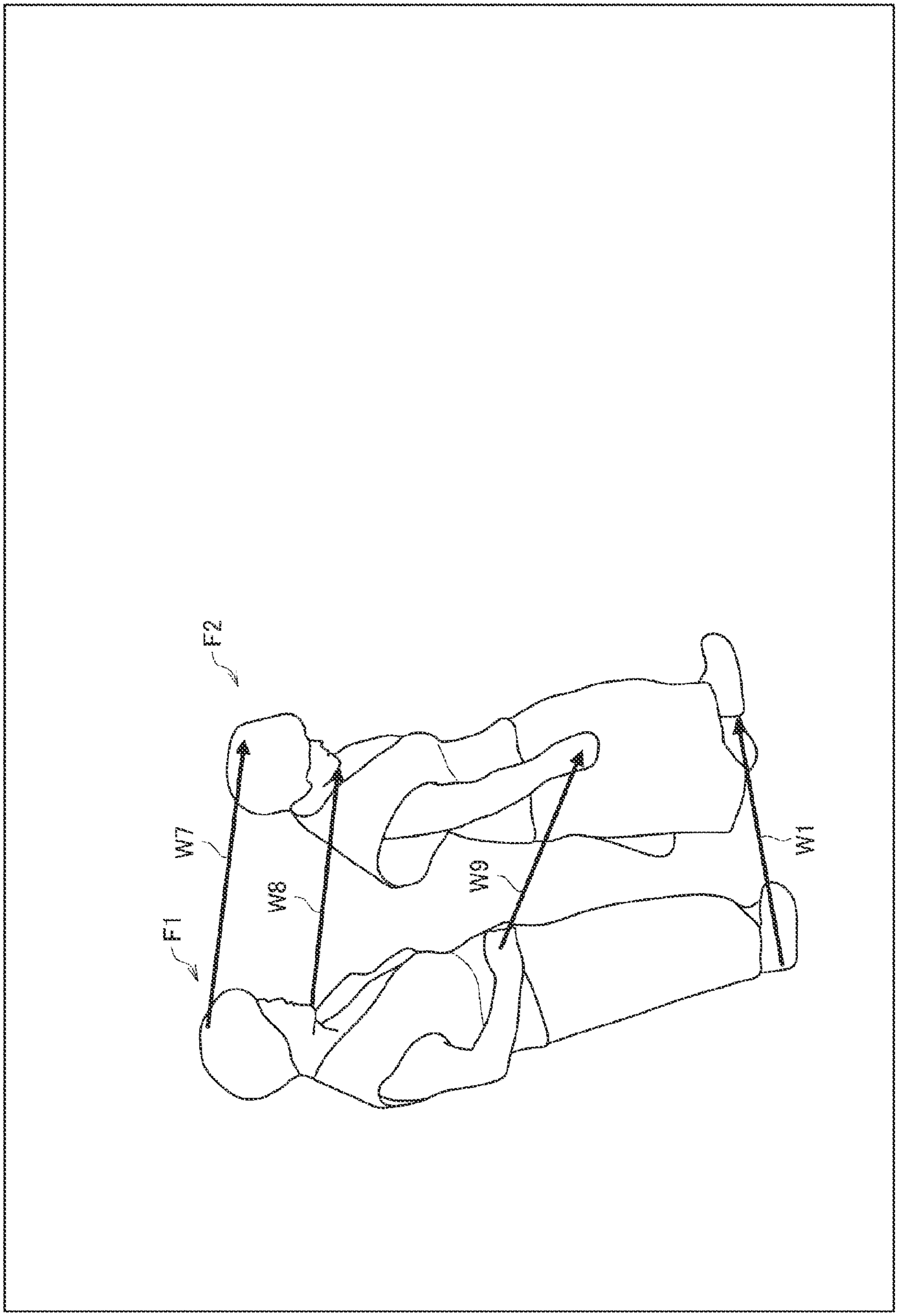
FIG. 8 is a diagram illustrating an example of optical flows calculated by an optical flow calculation unit.

FIG. 8 is a diagram illustrating an example of optical flows calculated by the optical flow calculation unit 122. The three-dimensional model F1 is a three-dimensional model in the frame N. In addition, the three-dimensional model F2 is a three-dimensional model in the frame N+1. Referring to FIG. 8, it is indicated, as optical flows W1 and W7 to W9, to which meshes included in the three-dimensional model F2 the four meshes included in the three-dimensional model F1 in the frame N have moved in the frame N+1.

(Effect Position Calculation Unit 123)

The effect position calculation unit 123 acquires information indicating an effect position in the frame N. The effect position may be input by the creator or may be stored in the storage unit 150 in advance. Then, the effect position calculation unit 123 calculates a movement destination position of an effect on the basis of statistical processing for the respective optical flows of the plurality of meshes present within a predetermined distance from the effect position in the frame N.

This enables to more accurately estimate the movement destination position of the effect. Then, since the movement destination position of the effect is accurately estimated, it is no longer necessary for the creator to determine all the positions of the effects, and the workload put on the creator can be reduced. In particular, the load put on a creator for the work of causing the effect to follow the hand or foot or a prop can be reduced.

Note that, as described above, in the embodiment of the present disclosure, a case where the processing of calculating the average value is used as an example of the statistical processing will be mainly described. However, the statistical processing is not limited to the processing of calculating the average value. For example, the statistical processing may be processing of extracting a mode value. Note that whether to use the processing of calculating the average value or the processing of extracting the mode value as the statistical processing may be appropriately determined according to the characteristics or the like of the volumetric data.

Figure 9:
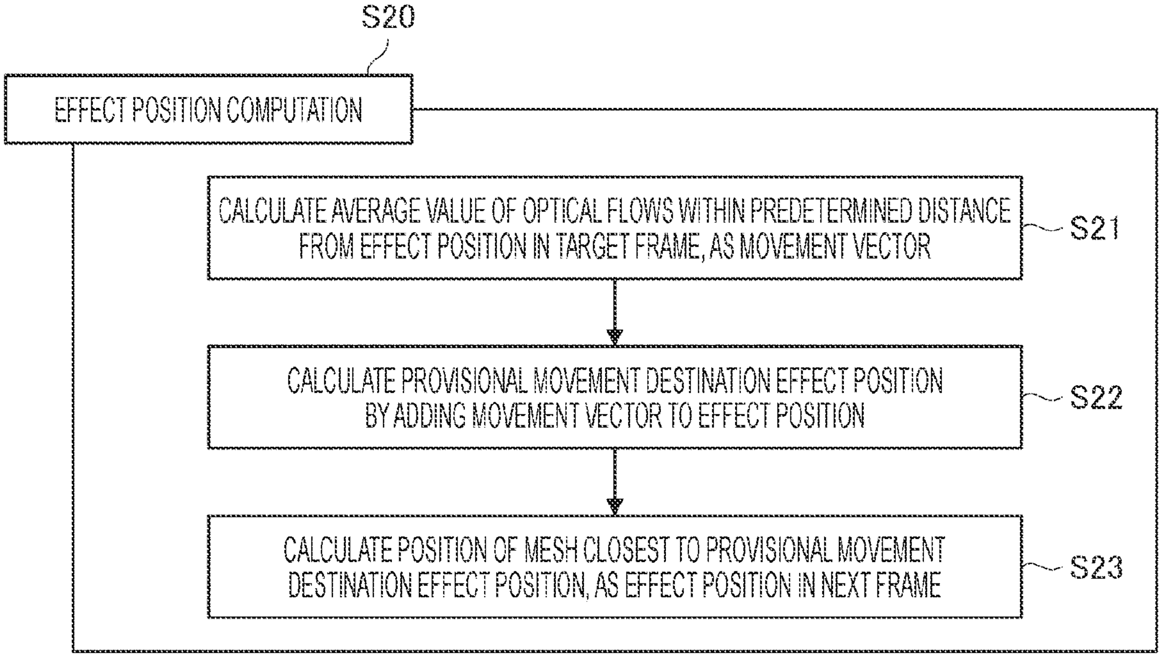
FIG. 9 is a flowchart illustrating an example of computation of a movement destination position of an effect.
Figure 10:
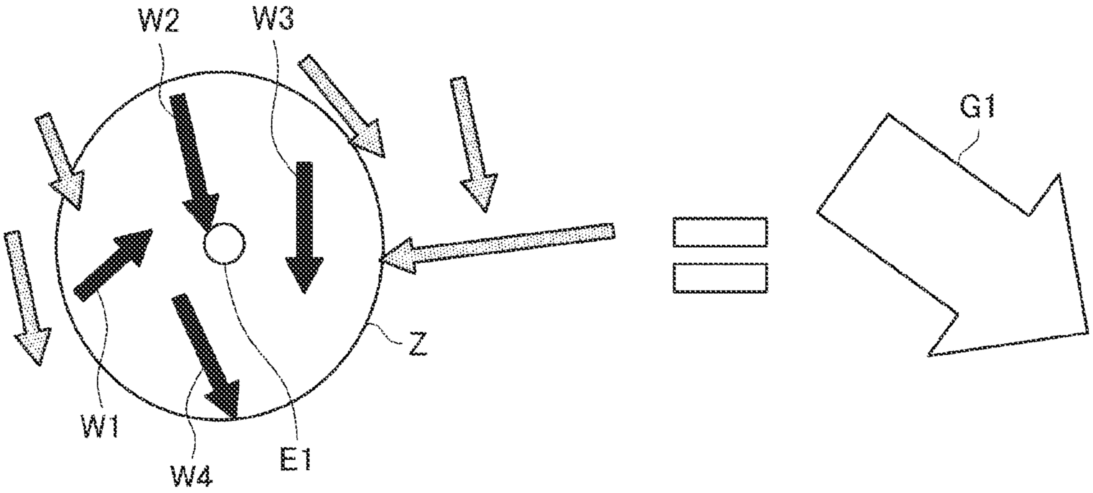
FIG. 10 is a diagram for explaining an example of computation of a movement destination position of an effect.

FIG. 9 is a flowchart illustrating an example of computation of a movement destination position of an effect. FIG. 10 is a diagram for explaining an example of computation of a movement destination position of an effect. An example of computation S20 of a movement destination position of an effect will be described in detail with reference to FIGS. 9 and 10.

As illustrated in FIG. 9, the effect position calculation unit 123 calculates, as a movement vector of an effect, an average value of respective optical flows of a plurality of meshes present within a predetermined distance (denoted as Z cm) from the effect position in the frame N. Z cm may be a fixed value or may be variable. For example, Z cm may be adjusted according to the size or the like of a part (such as a hand or a foot as an example) to which an effect is attached.

Referring to FIG. 10, an effect E1 in the frame N is illustrated. In addition, a set of three-dimensional coordinates separated by Z cm from the position of the effect E1 is illustrated as a range Z. The optical flows W1 to W4 are optical flows of respective meshes (fifth surfaces) present within Z cm from the position of the effect E1. The effect position calculation unit 123 calculates an average value of the optical flows W1 to W4 as a movement vector G1 of the position of the effect E1.

Note that, in the example illustrated in FIG. 10, the number of meshes present within Z cm from the position of the effect E1 is four, but the number of meshes present within Z cm from the position of the effect E1 may not be four or may have one or a plurality of meshes. The effect position calculation unit 123 calculates a movement destination position of the effect on the basis of the position of the effect E1 in the frame N and the movement vector G1.

In more detail, the effect position calculation unit 123 adds the position of the effect E1 in the frame N and the movement vector G1, thereby calculating a provisional movement destination position of the effect (S22). Then, the effect position calculation unit 123 calculates the position of a mesh closest to the calculated provisional movement destination position of the effect, as the effect position in the frame N+1 (S23).

(Effect Position Proposal Unit 124)

The effect position proposal unit 124 proposes an effect position in the frame N+1. In more detail, the effect position proposal unit 124 functions as an example of an output control unit that controls output of information regarding the movement destination position of the effect and the frame N+1 by an output unit. This allows the creator to perform, in creating a three-dimensional moving image, a work of attaching an effect to the frame N+1 while referring to the information regarding the movement destination position of the effect.

Figure 11:
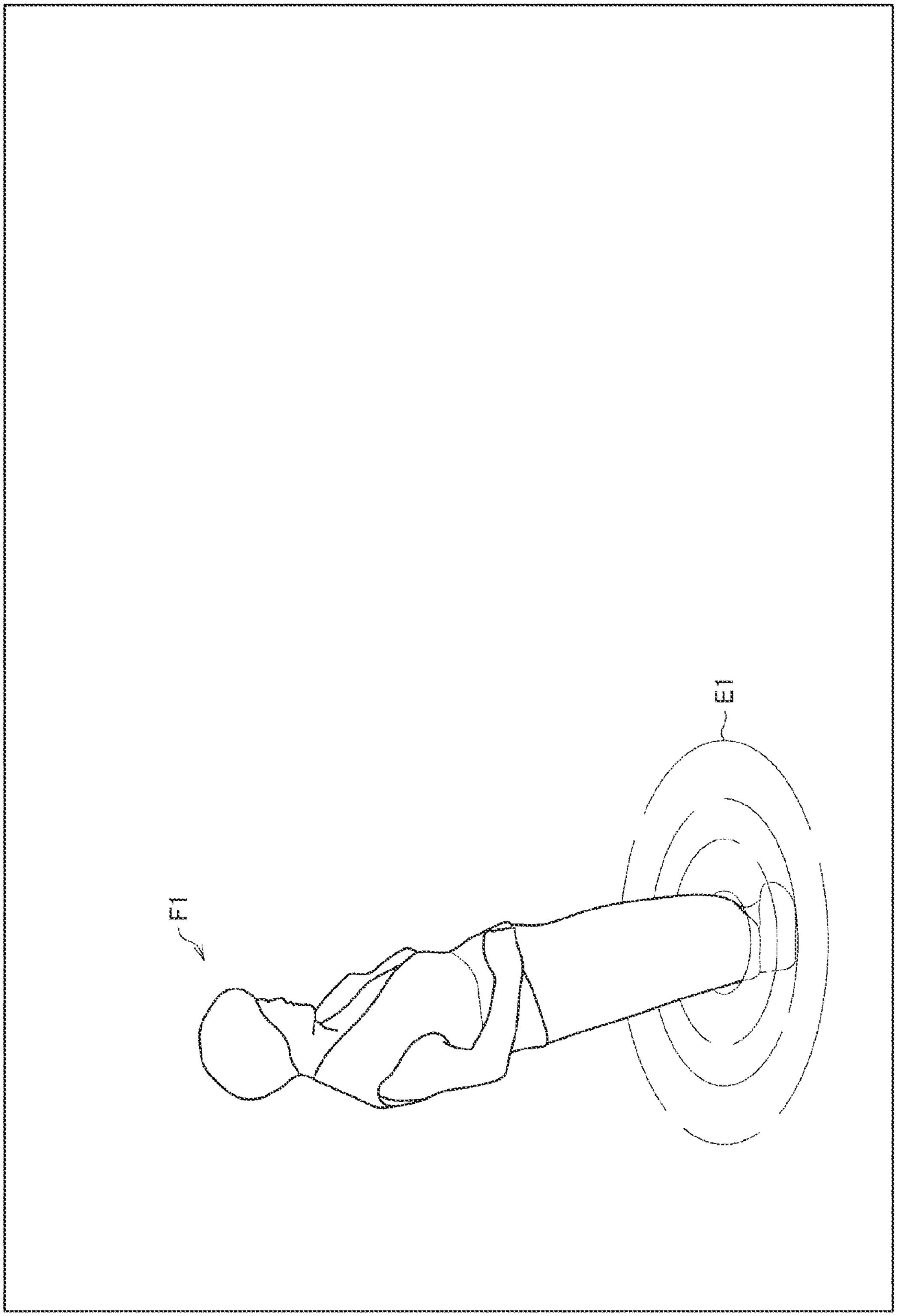
FIG. 11 is a diagram illustrating a position of an effect in a frame N.

FIG. 11 is a diagram illustrating a position of an effect in the frame N. Referring to FIG. 11, the three-dimensional model F1 in the frame N is illustrated. In the frame N, the effect E1 is attached to a position with reference to a specified part (here, the foot) of the three-dimensional model F1. Note that, here, a wave raised by the foot being immersed in water is illustrated as an example of the effect E1, but the effect E1 is not particularly limited as long as the effect E1 is a visual object.

Figure 12:
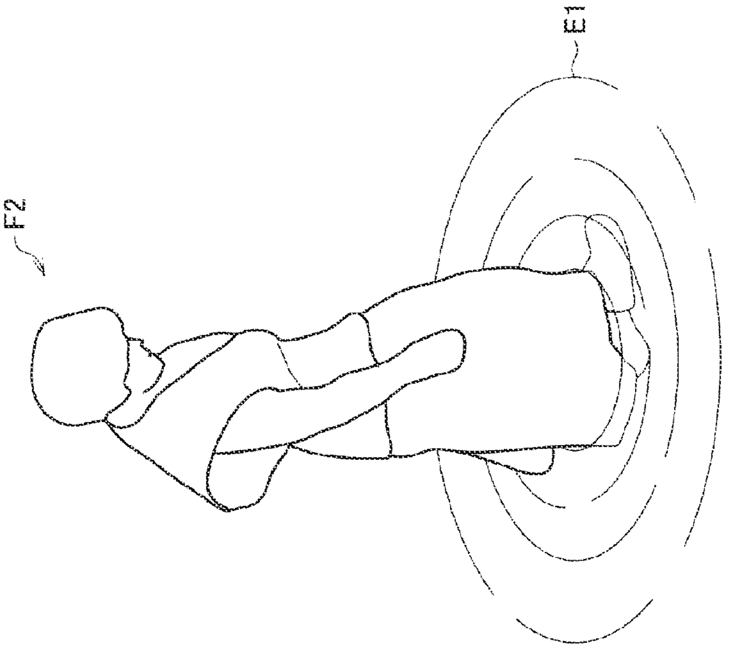
FIG. 12 is a diagram illustrating a movement destination position of the effect in a frame N+1.

FIG. 12 is a diagram illustrating a movement destination position of the effect in the frame N+1. Referring to FIG. 12, the three-dimensional model F2 in the frame N+1 is illustrated. In the frame N+1, the effect E1 moved to the movement destination position calculated by the effect position calculation unit 123 is attached. As in this example, the information regarding the movement destination position of the effect may include the effect E1 moved to the movement destination position in the frame N+1. This allows the creator to easily check the movement destination position of the effect.

Note that, here, a case where the output unit includes the display unit 130, and the effect position proposal unit 124 controls the information regarding the movement destination position of the effect, the frame N+1, and the display by the display unit 130 will be mainly assumed. However, a case where a terminal used by the creator for work and the information processing apparatus 10 are different apparatus can also be assumed. Accordingly, the output unit may include a communication unit, and the effect position proposal unit 124 may control transmission of the information regarding the movement destination position of the effect and the frame N+1 to the terminal by the communication unit.

(Effect Position Correction Unit 125)

The creator performs a work of attaching an effect to the frame N+1 while checking the effect position in the frame N+1 proposed by the effect position proposal unit 124. For example, in a case where the creator desires to adopt the proposed effect position, the creator inputs an operation of confirming the effect position to the operation unit 140. On the other hand, the creator inputs a correction operation for the proposed effect position to the operation unit 140 and inputs an operation of confirming the effect position to the operation unit 140.

(Recording Control Unit 126)

The recording control unit 126 controls recording of the effect position in the frame N+1 to the storage unit 150 on the basis of the fact that an operation of confirming the effect position in the frame N+1 has been input. For example, in a case where the effect position proposed by the effect position proposal unit 124 has been corrected by the creator, the recording control unit 126 controls recording of the corrected position of the effect in the frame N+1 to the storage unit 150 on the basis of the fact that the correction has been made to the proposed effect position.

The functional details of the information processing apparatus 10 according to the embodiment of the present disclosure has been described above.

2. Various Modifications

Next, various modifications of the information processing apparatus 10 according to the embodiment of the present disclosure will be described.

(First Modification)

In the above embodiment, an example in which the creator confirms the effect position in the frame N+1 has been described. In the following, a modification in which the effect position in the frame N+1 is automatically confirmed will be described as a first modification. For example, this first modification is preferable in a case where a user views and listens to a moving image to which an effect is automatically attached, as an example.

Figure 13:
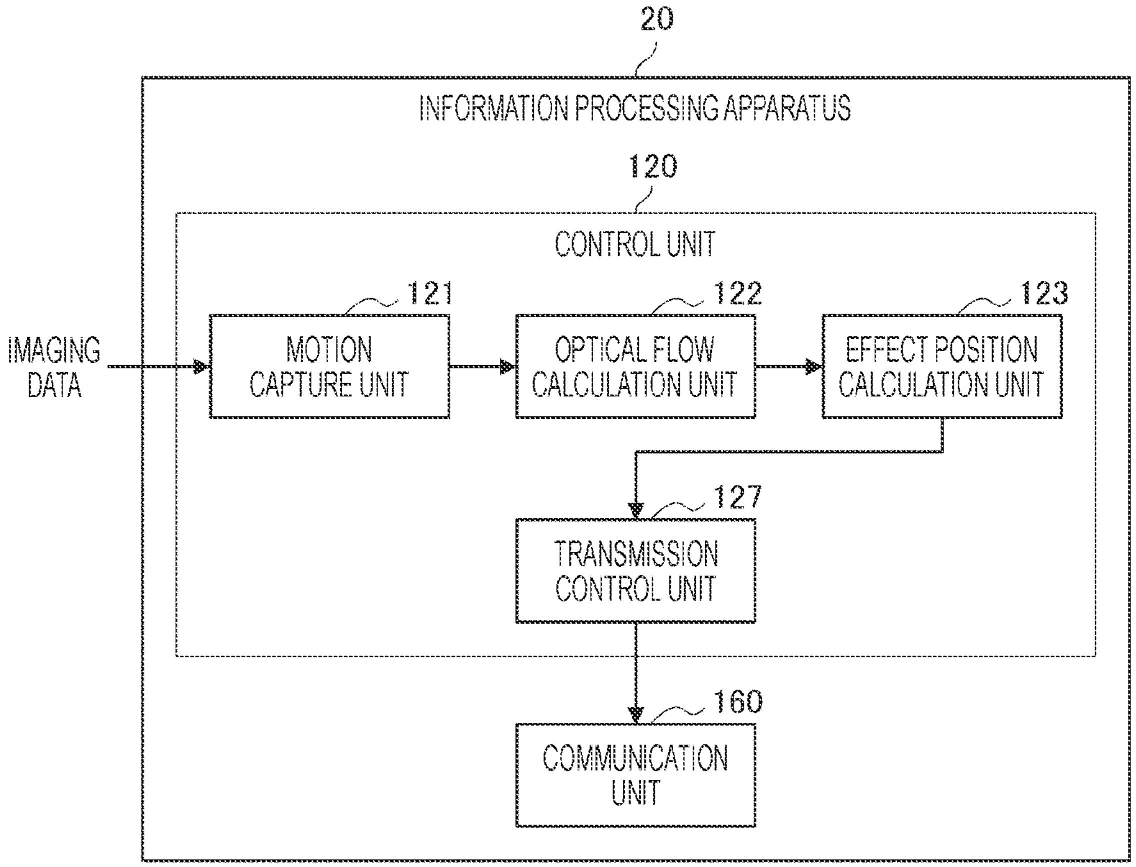
FIG. 13 is a diagram for explaining a configuration example of an information processing apparatus according to a first modification.

FIG. 13 is a diagram for explaining a configuration example of an information processing apparatus according to the first modification. As illustrated in FIG. 13, an information processing apparatus 20 according to the first modification is implemented by a computer and includes a control unit 120 and a communication unit 160. The control unit 120 includes a motion capture unit 121, an optical flow calculation unit 122, an effect position calculation unit 123, and a transmission control unit 127.

(Communication Unit 160)

The communication unit 160 is constituted by a communication interface. For example, the communication unit 160 communicates with a terminal of the user via a network (not illustrated).

(Transmission Control Unit 127)

The transmission control unit 127 assigns an effect to the movement destination position of the effect calculated by the effect position calculation unit 123 in the frame N+1. Then, the transmission control unit 127 controls transmission of the frame N+1 to which the effect has been assigned, to the terminal of the user by the communication unit 160. This can ensure that a moving image to which an effect that automatically follows the motion of the three-dimensional object is attached is visually recognized by the user.

(Second Modification)

In the above embodiment, an example in which both of the frame N and the frame N+1 are transmitted has been described. In the following, a modification in which the frame N and the optical flow of each mesh in the frame N are transmitted without transmitting the frame N+1 will be described as a second modification. At this time, the receiving side moves each mesh in the frame N+1 on the basis of the frame N and the optical flow of each mesh in the frame N.

Since it is assumed that the optical flow of each mesh in the frame N has a small data amount as compared with the data amount of the frame N+1, according to such an example, a decrease in data transmission amount can be implemented. For example, such a second modification is preferable in a case where a user at the receiving side views and listens the moving image, as an example.

Figure 14:
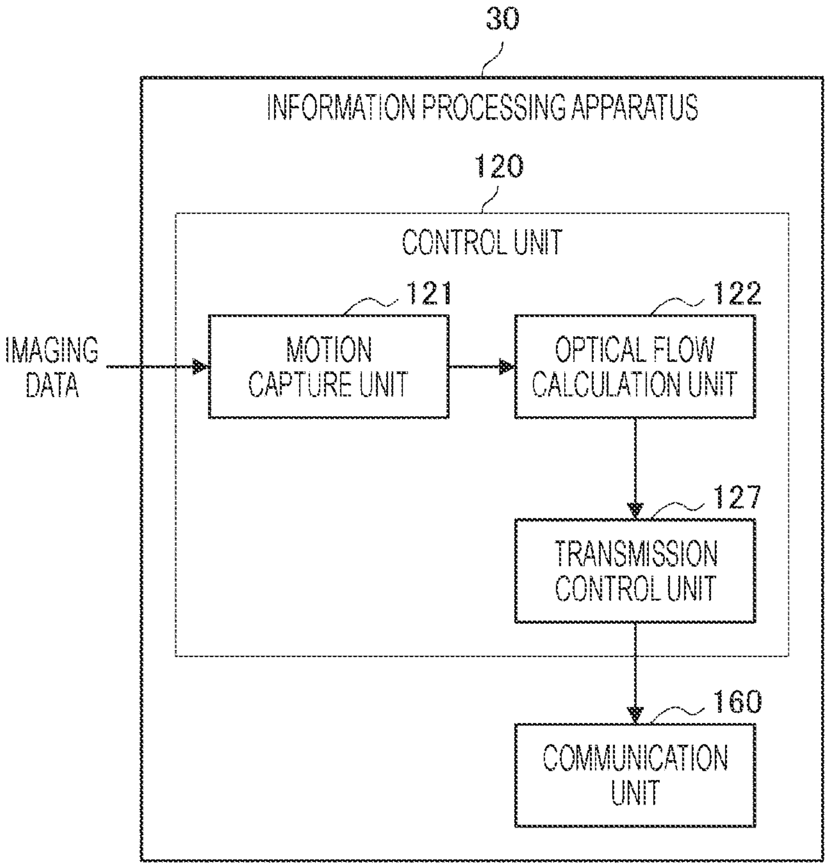
FIG. 14 is a diagram for explaining a configuration example of an information processing apparatus according to a second modification.

FIG. 14 is a diagram for explaining a configuration example of an information processing apparatus according to the second modification. As illustrated in FIG. 14, an information processing apparatus 30 according to the second modification is implemented by a computer and includes a control unit 120 and a communication unit 160. The control unit 120 includes a motion capture unit 121, an optical flow calculation unit 122, and a transmission control unit 127.

(Transmission Control Unit 127)

The transmission control unit 127 controls transmission of the frame N and the optical flow of each mesh in the frame N to the terminal of the user by the communication unit 160. The terminal of the user moves each mesh in the frame N+1 on the basis of the frame N and the optical flow of each mesh in the frame N. This can implement a decrease in data transmission amount.

(Third Modification)

In the above embodiment, a case where the optical flow is calculated on a mesh basis has been mainly described. However, the optical flow may be calculated on a vertex basis. That is, in the above embodiment, a case where the optical flow is calculated using the three-dimensional coordinates of the mesh and the color information on the mesh has been mainly described. However, the three-dimensional coordinates of the vertex and the color information on the vertex may be used to calculate the optical flow.

In more detail, the optical flow calculation unit 122 extracts one or a plurality of vertices satisfying a predetermined relationship with a target vertex (denoted as C1), as vertices (third vertices) in the statistical processing range of the target vertex C1, from among a plurality of vertices included in the frame N+1. Then, the optical flow calculation unit 122 calculates a provisional optical flow of each vertex in the statistical processing range.

Here, the vertex satisfying the predetermined relationship with the target vertex C1 may have a mesh whose distance from the target vertex C1 is smaller than the second threshold value. In more detail, the optical flow calculation unit 122 extracts one or a plurality of vertices having three-dimensional coordinates whose distance from the three-dimensional coordinates of the target vertex C1 is smaller than the second threshold value, as vertices in the statistical processing range of the target vertex C1, from among a plurality of vertices included in the frame N+1. Here, it is supposed that vertices C1 to C18 are extracted as vertices in the statistical processing range of the target vertex C1.

Next, the optical flow calculation unit 122 extracts one or a plurality of vertices having three-dimensional coordinates whose distance from the three-dimensional coordinates of the vertex C1 in the statistical processing range is smaller than the first threshold value. Then, the optical flow calculation unit 122 extracts a vertex with the color information having the smallest difference from the color information on the vertex C1 in the statistical processing range, as a movement destination candidate vertex of the vertex C1 in the statistical processing range, from among the extracted one or more vertices. The optical flow calculation unit 122 calculates a movement vector from the three-dimensional coordinates of the vertex C1 in the statistical processing range to the three-dimensional coordinates of the extracted movement destination candidate vertex, as a provisional optical flow of the vertex C1.

Similarly, the optical flow calculation unit 122 extracts a movement destination candidate vertex (fourth vertex) of each of the vertices C2 to C18 in the statistical processing range. Then, the optical flow calculation unit 122 calculates a provisional optical flow of each of the vertices C2 to M18 in the statistical processing range.

Next, the optical flow calculation unit 122 calculates the optical flow of the target vertex C1 on the basis of the statistical processing for the provisional optical flows of the respective vertices C1 to C18 in the statistical processing range. The optical flow calculation unit 122 calculates the optical flows of all the vertices included in the frame N by an approach similar to the approach for calculating the optical flow of the target vertex C1.

The effect position calculation unit 123 calculates, as a movement vector of the effect, an average value of respective optical flows of a plurality of vertices present within a predetermined distance from the effect position in the frame N. The effect position calculation unit 123 calculates a movement destination position of the effect on the basis of the position of the effect E1 in the frame N and the movement vector of the effect.

In more detail, the effect position calculation unit 123 adds the position of the effect E1 in the frame N and the movement vector, thereby calculating a provisional movement destination position of the effect. Then, the effect position calculation unit 123 calculates the position of a mesh closest to the calculated provisional movement destination position of the effect, as the effect position in the frame N+1.

Various modifications of the information processing apparatus 10 according to the embodiment of the present disclosure have been described above.

3. Hardware Configuration Example

Figure 15:
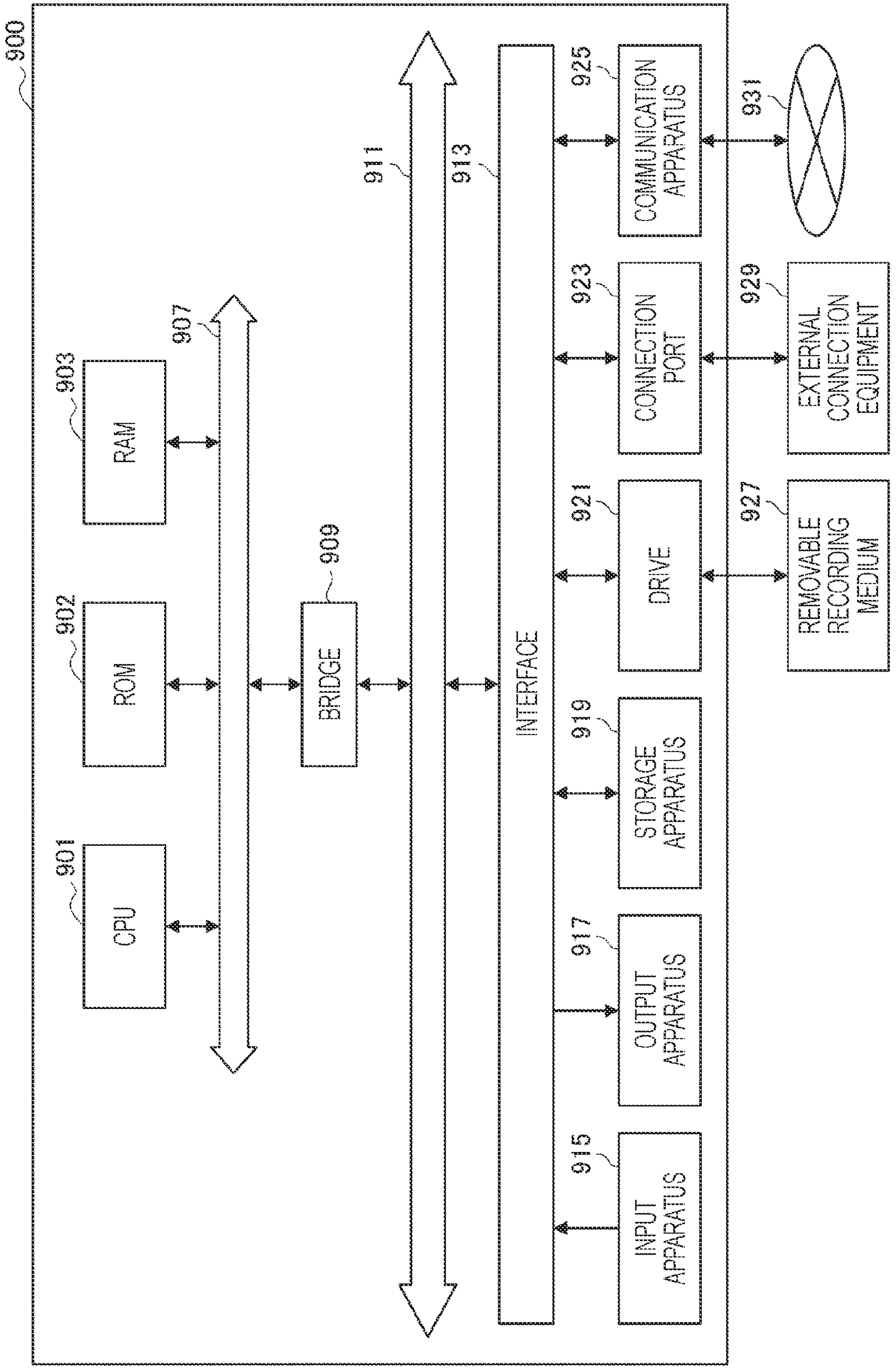
FIG. 15 is a block diagram illustrating a hardware configuration example of an information processing apparatus.

Next, a hardware configuration example of an information processing apparatus 900 as an example of the information processing apparatus 10 according to the embodiment of the present disclosure will be described with reference to FIG. 15. FIG. 15 is a block diagram illustrating a hardware configuration example of the information processing apparatus 900. Note that the information processing apparatus 10 does not necessarily have to have the whole hardware configuration illustrated in FIG. 15, and a part of the hardware configuration illustrated in FIG. 15 may not be present within the information processing apparatus 10.

As illustrated in FIG. 15, the information processing apparatus 900 includes a central processing unit (CPU) 901, a read-only memory (ROM) 903, and a random-access memory (RAM) 905. In addition, the information processing apparatus 900 may include a host bus 907, a bridge 909, an external bus 911, an interface 913, an input apparatus 915, an output apparatus 917, a storage apparatus 919, a drive 921, a connection port 923, and a communication apparatus 925. The information processing apparatus 900 may have a processing circuit, for example, called a digital-signal processor (DSP) or an application-specific integrated circuit (ASIC) instead of or in combination with the CPU 901.

The CPU 901 functions as an arithmetic processing apparatus and a control apparatus and controls overall working in the information processing apparatus 900 or a part thereof, in accordance with various programs recorded in the ROM 903, the RAM 905, the storage apparatus 919, or a removable recording medium 927. The ROM 903 stores programs, arithmetic parameters, and the like used by the CPU 901. The RAM 905 temporarily stores a program used in execution by the CPU 901, parameters that change as appropriate during the execution, and the like. The CPU 901, ROM 903, and RAM 905 are connected to each other by the host bus 907 constituted by an internal bus such as a CPU bus. Furthermore, the host bus 907 is connected to the external bus 911 such as a peripheral component interconnect/interface (PCI) bus via the bridge 909.

The input apparatus 915 is, for example, an apparatus operated by the user, such as a button. The input apparatus 915 may include a mouse, a keyboard, a touch panel, a switch, a lever, or the like. In addition, the input apparatus 915 may include a microphone that detects voice of the user. The input apparatus 915 may be, for example, a remote control apparatus utilizing infrared light or other radio waves or may be external connection equipment 929 such as a mobile phone compatible with the operation of the information processing apparatus 900. The input apparatus 915 includes an input control circuit that generates and outputs an input signal to the CPU 901 on the basis of information input by the user. By operating this input apparatus 915, the user inputs various kinds of data or gives an instruction on processing working to the information processing apparatus 900, for example. Furthermore, an imaging apparatus 933 to be described later can also function as an input apparatus by imaging the motion of a hand of the user, a finger of the user, or the like. At this time, a pointing position may be designated according to the motion of the hand or the orientation of the finger.

The output apparatus 917 is constituted by an apparatus that can visually or audibly notify the user of acquired information. For example, the output apparatus 917 can be a display apparatus such as a liquid crystal display (LCD) or an organic electro-luminescence (EL) display, a sound output apparatus such as a speaker or headphones, or the like. In addition, the output apparatus 917 may include a plasma display panel (PDP), a projector, a hologram, a printer apparatus, or the like. The output apparatus 917 outputs a result obtained by processing by the information processing apparatus 900 as a video including a text or an image or outputs the result as a sound such as voice or acoustics, for example. In addition, the output apparatus 917 may include a light or the like in order to brighten the surroundings.

The storage apparatus 919 is an apparatus for holding data configured as an example of a storage unit of the information processing apparatus 900. For example, the storage apparatus 919 is constituted by a magnetic storage device such as a hard disk drive (HDD), a semiconductor storage device, an optical storage device, a magneto-optical storage device, or the like. This storage apparatus 919 holds programs and various kinds of data executed by the CPU 901, various kinds of data acquired from the outside, and the like.

The drive 921 is a reader/writer for the removable recording medium 927 such as a magnetic disk, an optical disc, a magneto-optical disk, or a semiconductor memory and is built in or externally attached to the information processing apparatus 900. The drive 921 reads information recorded in the mounted removable recording medium 927 and outputs the read information to the RAM 905. In addition, the drive 921 writes records in the mounted removable recording medium 927.

The connection port 923 is a port for directly connecting equipment to the information processing apparatus 900. For example, the connection port 923 can be a universal serial bus (USB) port, an Institute of Electrical and Electronics Engineers (IEEE) 1394 port, a small computer system interface (SCSI) port, or the like. In addition, the connection port 923 may be a recommended standard (RS)-232C port, an optical audio terminal, a high-definition multimedia interface (HDMI (registered trademark)) port, or the like. By connecting the external connection equipment 929 to the connection port 923, various kinds of data can be exchanged between the information processing apparatus 900 and the external connection equipment 929.

The communication apparatus 925 is, for example, a communication interface constituted by a communication device or the like for connecting to a network 931. For example, the communication apparatus 925 can be a communication card for a wired or wireless local area network (LAN), Bluetooth (registered trademark), wireless USB (WUSB), or the like. In addition, the communication apparatus 925 may be a router for optical communication, a router for asymmetric digital subscriber line (ADSL), a modem for various kinds of communication, or the like. For example, the communication apparatus 925 transmits and receives signals and the like to and from the Internet and other communication equipment, using a predetermined protocol such as transmission control protocol/Internet protocol (TCP/IP). In addition, the network 931 connected to the communication apparatus 925 is a network connected in a wired or wireless manner and, for example, is the Internet, a home LAN, infrared communication, radio wave communication, satellite communication, or the like.

4. Conclusion

According to the embodiment of the present disclosure, there is provided an information processing apparatus including a movement amount calculation unit that calculates a movement amount associated with a first vertex included in a first frame on the basis of statistical processing according to color information associated with the first vertex, color information associated with a second vertex included in a second frame after the first frame, three-dimensional coordinates associated with the first vertex, and three-dimensional coordinates associated with the second vertex. According to such a configuration, a motion of the three-dimensional model between the plurality of frames can be estimated more accurately.

Finally, further divergence between the technology according to the embodiment of the present disclosure and other existing technologies will be summarized. First, as a first existing technology, there is a technology described in Japanese Patent Application Laid-Open No. 2020-136943. The first existing technology is a technology of comparing three-dimensional models between consecutive frames, associating the three-dimensional models having the closest shapes with each other, making parts of the three-dimensional models correlated between the frames on the basis of the association, and estimating movement of the parts.

According to the first existing technology, movements can also be estimated for each body part. However, in the first existing technology, the estimation of the part movement depends on the accuracy of the taken mesh image. Therefore, the first existing technology is unlikely to be applied to an object that is greatly deformed between consecutive frames (such as a dress during dance as an example). Furthermore, the first existing technology is unlikely to be applied to a case where there is a plurality of objects having similar shapes (such as a case where a large number of balls of the same size are rolling, as an example).

Moreover, in the first existing technology, it is required to use another known technology, and thus a large processing amount and a long processing time are involved. In addition, the first existing technology is premised on use of an external library, and it accordingly takes much time and effort to equip the function according to the first existing technology, while the processing amount increases.

In the first existing technology, a movement of a part of the three-dimensional model is estimated on the basis of shape information using the shape fitting, whereas the technology according to the embodiment of the present disclosure estimates a movement of a part of the three-dimensional model on the basis of the color information (such as the hue as an example).

Accordingly, the first existing technology is difficult to apply to a small object, an object with great deformation, or the like. In contrast to that, the technology according to the embodiment of the present disclosure is suitable for application to a colorful object that is frequently deformed (such as objects appearing in dances, live performances, and the like, as an example).

Furthermore, as a second existing technology, there is a technology described in Japanese Unexamined Patent Application Publication No. 2002-517859. The second existing technology is a technology of detecting a motion of a mesh of a face from imaging data by imaging a person with a marker attached to the face.

Since the second existing technology is a technology of attaching a marker to a face, it is difficult in the second existing technology to borrow the three-dimensional data extracted from imaging data as it is as volumetric content. Therefore, it is necessary to perform processing to delete the marker before borrowing the three-dimensional data as volumetric content. Furthermore, in the second existing technology, the motion of the mesh can be recognized only at the position to which the marker is attached.

The technology according to the embodiment of the present disclosure is a markerless technology. Therefore, the technology according to the embodiment of the present disclosure only involves a small burden at the time of imaging as compared with the second existing technology. Additionally to this, in the markerless technology, processing at the time of generating the volumetric content can also be easily performed.

For example, as a modification of the second existing technology, it can be expected that a marker is attached to an object apart from the face (such as a prop as an example) and the attached place is tracked. However, also in such a modification, since it is necessary to delete the marker from the three-dimensional model of the object to which the marker is attached, the technology according to the embodiment of the present disclosure only involves a lower cost at the time of image taking and at the time of generation.

Furthermore, in the second existing technology, what is to be tracked needs to be clear at the time of image taking. On the other hand, in the technology according to the embodiment of the present disclosure, it is possible to designate the tracking target or adjust the tracking target after imaging is performed, for example.

The preferred embodiments of the present disclosure have been described in detail thus far with reference to the accompanying drawings. However, the technological scope of the present disclosure is not limited to these examples. It is obvious that a person with average knowledge on the technological field of the present disclosure can conceive various adjustments or variations within the range of the technological spirit disclosed in the claims, and as a matter of course, these adjustments or variations are construed as part of the technological scope of the present disclosure.

In addition, the effects described in the present description are merely exemplary or illustrative, and not restrictive. In other words, the technology according to the present disclosure can produce other effects that are apparent to those skilled in the art from the explanation in the present description, in combination with or instead of the effects described above.

Note that the following configurations also fall within the technological scope of the present disclosure.

(1)

An information processing apparatus including a movement amount calculation unit that calculates a movement amount associated with a first vertex included in a first frame on the basis of statistical processing according to color information associated with the first vertex, color information associated with a second vertex included in a second frame after the first frame, three-dimensional coordinates associated with the first vertex, and three-dimensional coordinates associated with the second vertex.

(2)

The information processing apparatus according to (1) above, in which the information processing apparatus further includes an effect position calculation unit that calculates a movement destination position of an effect on the basis of the movement amount associated with the first vertex and a position in the first frame of the effect.

(3)

The information processing apparatus according to (2) above, in which the information processing apparatus further includes an output control unit that controls an output of information regarding the movement destination position of the effect and the second frame by an output unit.

(4)

The information processing apparatus according to (3) above, in which the information regarding the movement destination position of the effect includes the effect moved to the movement destination position of the effect in the second frame.

(5)

The information processing apparatus according to (4) or (5) above, in which the information processing apparatus further includes a recording control unit that controls recording of the position after correction of the effect on the basis of the fact that a correction has been made to the movement destination position of the effect.

(6)

The information processing apparatus according to any one of (3) to (5) above, in which the output unit includes a communication unit or a display unit, and the output control unit controls transmission of the information regarding the movement destination position of the effect and the second frame by the communication unit or display of the information regarding the movement destination position of the effect and the second frame by the display unit.

(7)

The information processing apparatus according to (1) above, in which the information processing apparatus further includes a transmission control unit that controls transmission of the first frame and the movement amount associated with the first vertex by a communication unit.

(8)

The information processing apparatus according to any one of (1) to (7) above, in which the statistical processing includes processing of extracting a mode value or processing of calculating an average value.

(9)

The information processing apparatus according to any one of (1) to (8) above, in which each of the color information associated with the first vertex and the color information associated with the second vertex includes a hue.

(10)

The information processing apparatus according to (1) above, in which the first vertex forms a first surface, the second vertex forms a second surface, the color information associated with the first vertex includes the color information on the first surface, the color information associated with the second vertex includes the color information on the second surface, the three-dimensional coordinates associated with the first vertex include the three-dimensional coordinates of the first surface, the three-dimensional coordinates associated with the second vertex include the three-dimensional coordinates of the second surface, and the movement amount associated with the first vertex includes the movement amount of the first surface.

(11)

The information processing apparatus according to (10) above, in which the movement amount calculation unit:

calculates the color information on the first surface on the basis of the color information on the first vertex, and also calculates the color information on the second surface on the basis of the color information on the second vertex; and calculates the three-dimensional coordinates of the first surface on the basis of the three-dimensional coordinates of the first vertex, and also calculates the three-dimensional coordinates of the second surface on the basis of the three-dimensional coordinates of the second vertex.

(12)

The information processing apparatus according to (10) or (11) above, in which the movement amount calculation unit extracts one or a plurality of surfaces having the three-dimensional coordinates whose distance from the three-dimensional coordinates of the first surface is smaller than a first threshold value, from among a plurality of surfaces included in the second frame, and extracts a surface with the color information having a smallest difference from the color information on the first surface, from among the extracted one or plurality of surfaces, as the second surface.

(13)

The information processing apparatus according to (12) above, in which the movement amount calculation unit: extracts one or a plurality of surfaces having the three-dimensional coordinates whose distance from the three-dimensional coordinates of a third surface is smaller than the first threshold value, from among a plurality of surfaces included in the second frame, and extracts a surface with the color information having a smallest difference from the color information on the third surface, from among the extracted one or plurality of surfaces, as a fourth surface; and in a case where the distance between the three-dimensional coordinates of the first surface and the three-dimensional coordinates of the third surface is smaller than a second threshold value, calculates the movement amount of the first surface on the basis of the statistical processing for the distance between the three-dimensional coordinates of the first surface and the three-dimensional coordinates of the second surface, and the distance between the three-dimensional coordinates of the third surface and the three-dimensional coordinates of the fourth surface.

(14)

The information processing apparatus according to any one of (10) to (13) above, in which the information processing apparatus further includes an effect position calculation unit that, in a case where the first surface and a fifth surface are present within a predetermined distance from a position of an effect in the first frame, calculates a movement destination position of the effect on the basis of the statistical processing for the movement amount of the first surface and the movement amount of the fifth surface.

(15)

The information processing apparatus according to (1) above, in which the color information associated with the first vertex includes the color information on the first vertex, the color information associated with the second vertex includes the color information on the second vertex, the three-dimensional coordinates associated with the first vertex include the three-dimensional coordinates of the first vertex, the three-dimensional coordinates associated with the second vertex include the three-dimensional coordinates of the second vertex, and the movement amount associated with the first vertex includes the movement amount of the first vertex.

(16)

The information processing apparatus according to (15) above, in which the movement amount calculation unit extracts one or a plurality of vertices having the three-dimensional coordinates whose distance from the three-dimensional coordinates of the first vertex is smaller than a first threshold value, from among a plurality of vertices included in the second frame, and extracts a vertex with the color information having a smallest difference from the color information on the first vertex, from among the extracted one or plurality of vertices, as the second vertex.

(17)

The information processing apparatus according to (16) above, in which the movement amount calculation unit: extracts one or a plurality of vertices having the three-dimensional coordinates whose distance from the three-dimensional coordinates of a third vertex is smaller than the first threshold value, from among a plurality of vertices included in the second frame, and extracts a vertex with the color information having a smallest difference from the color information on the third vertex, from among the extracted one or plurality of vertices, as a fourth vertex; and in a case where the distance between the three-dimensional coordinates of the first vertex and the three-dimensional coordinates of the third vertex is smaller than a second threshold value, calculates the movement amount of the first vertex on the basis of the statistical processing for the distance between the three-dimensional coordinates of the first vertex and the three-dimensional coordinates of the second vertex, and the distance between the three-dimensional coordinates of the third vertex and the three-dimensional coordinates of the fourth vertex.

(18)

The information processing apparatus according to any one of (15) to (17) above, in which the information processing apparatus further includes an effect position calculation unit that, in a case where the first vertex and a fifth vertex are present within a predetermined distance from a position of an effect in the first frame, calculates a movement destination position of the effect on the basis of the statistical processing for the movement amount of the first vertex and the movement amount of the fifth vertex.

(19)

An information processing method including calculating, by a processor, a movement amount associated with a first vertex included in a first frame on the basis of statistical processing according to color information associated with the first vertex, color information associated with a second vertex included in a second frame after the first frame, three-dimensional coordinates associated with the first vertex, and three-dimensional coordinates associated with the second vertex.

(20)

A program that causes a computer to function as an information processing apparatus including a movement amount calculation unit that calculates a movement amount associated with a first vertex included in a first frame on the basis of statistical processing according to color information associated with the first vertex, color information associated with a second vertex included in a second frame after the first frame, three-dimensional coordinates associated with the first vertex, and three-dimensional coordinates associated with the second vertex.

REFERENCE SIGNS LIST

10, 20, 30 Information processing apparatus
120 Control unit
121 Motion capture unit
122 Optical flow calculation unit
123 Effect position calculation unit
124 Effect position proposal unit
125 Effect position correction unit
126 Recording control unit
127 Transmission control unit
130 Display unit
140 Operation unit
150 Storage unit
160 Communication unit

The invention claimed is:

1. An information processing apparatus comprising:

circuitry configured to calculate a movement amount associated with a first vertex included in a first frame based on statistical processing according to color information associated with the first vertex, color information associated with a second vertex included in a second frame after the first frame, three-dimensional coordinates associated with the first vertex, and three-dimensional coordinates associated with the second vertex, and extract at least one surface having the three-dimensional coordinates whose distance from the three-dimensional coordinates of the first surface is smaller than a first threshold value, from among a plurality of surfaces included in the second frame.

2. The information processing apparatus according to claim 1, wherein the circuitry is further configured to calculate a movement destination position of an effect based on the movement amount associated with the first vertex and a position in the first frame of the effect.

3. The information processing apparatus according to claim 2, wherein the circuitry is further configured to control an output of information regarding the movement destination position of the effect and the second frame.

4. The information processing apparatus according to claim 3, wherein the information regarding the movement destination position of the effect includes the effect moved to the movement destination position of the effect in the second frame.

5. The information processing apparatus according to claim 4, wherein the circuitry is further configured to control recording of the position after correction of the effect based on a fact that a correction has been made to the movement destination position of the effect.

6. The information processing apparatus according to claim 3, wherein the circuitry controls transmission of the information regarding the movement destination position of the effect and the second frame or display of the information regarding the movement destination position of the effect and the second frame.

7. The information processing apparatus according to claim 1, wherein the circuitry is further configured to control transmission of the first frame and the movement amount associated with the first vertex.

8. The information processing apparatus according to claim 1, wherein the statistical processing includes at least one of processing of extracting a mode value or processing of calculating an average value.

9. The information processing apparatus according to claim 1, wherein each of the color information associated with the first vertex and the color information associated with the second vertex includes a hue.

10. The information processing apparatus according to claim 1, wherein the first vertex forms a first surface, wherein the second vertex forms a second surface, wherein the color information associated with the first vertex includes the color information on the first surface, wherein the color information associated with the second vertex includes the color information on the second surface, wherein the three-dimensional coordinates associated with the first vertex include the three-dimensional coordinates of the first surface, wherein the three-dimensional coordinates associated with the second vertex include the three-dimensional coordinates of the second surface, and wherein the movement amount associated with the first vertex includes the movement amount of the first surface.

11. The information processing apparatus according to claim 10, wherein the circuitry is further configured to calculate the color information on the first surface based on the color information on the first vertex, calculate the color information on the second surface based on the color information on the second vertex, calculate the three-dimensional coordinates of the first surface based on the three-dimensional coordinates of the first vertex, and calculate the three-dimensional coordinates of the second surface based on the three-dimensional coordinates of the second vertex.

12. The information processing apparatus according to claim 10, wherein the circuitry extracts a plurality of surfaces having the three-dimensional coordinates whose distance from the three-dimensional coordinates of the first surface is smaller than the first threshold value, from among the plurality of surfaces included in the second frame, and further extracts a surface with the color information having a smallest difference from the color information on the first surface, from among the extracted plurality of surfaces, as the second surface.

13. The information processing apparatus according to claim 12, wherein the circuitry is further configured to extract one or a plurality of surfaces having the three-dimensional coordinates whose distance from the three-dimensional coordinates of a third surface is smaller than the first threshold value, from among a plurality of surfaces included in the second frame, and extracts a surface with the color information having a smallest difference from the color information on the third surface, from among the extracted one or plurality of surfaces, as a fourth surface, and calculate, in a case where the distance between the three-dimensional coordinates of the first surface and the three-dimensional coordinates of the third surface is smaller than a second threshold value, the movement amount of the first surface based on the statistical processing for the distance between the three-dimensional coordinates of the first surface and the three-dimensional coordinates of the second surface, and the distance between the three-dimensional coordinates of the third surface and the three-dimensional coordinates of the fourth surface.

14. The information processing apparatus according to claim 10, wherein the circuitry is further configured to calculate, in a case where the first surface and a fifth surface are present within a predetermined distance from a position of an effect in the first frame, a movement destination position of the effect based on the statistical processing for the movement amount of the first surface and the movement amount of the fifth surface.

15. The information processing apparatus according to claim 1, wherein the color information associated with the first vertex includes the color information on the first vertex, wherein the color information associated with the second vertex includes the color information on the second vertex, wherein the three-dimensional coordinates associated with the first vertex include the three-dimensional coordinates of the first vertex, wherein the three-dimensional coordinates associated with the second vertex include the three-dimensional coordinates of the second vertex, and wherein the movement amount associated with the first vertex includes the movement amount of the first vertex.

16. The information processing apparatus according to claim 15, wherein the circuitry is further configured to extract one or a plurality of vertices having the three-dimensional coordinates whose distance from the three-dimensional coordinates of the first vertex is smaller than a first threshold value, from among a plurality of vertices included in the second frame, and extract a vertex with the color information having a smallest difference from the color information on the first vertex, from among the extracted one or plurality of vertices, as the second vertex.

17. The information processing apparatus according to claim 16, wherein the circuitry is further configured to extract one or a plurality of vertices having the three-dimensional coordinates whose distance from the three-dimensional coordinates of a third vertex is smaller than the first threshold value, from among a plurality of vertices included in the second frame, extract a vertex with the color information having a smallest difference from the color information on the third vertex, from among the extracted one or plurality of vertices, as a fourth vertex, and calculate, in a case where the distance between the three-dimensional coordinates of the first vertex and the three-dimensional coordinates of the third vertex is smaller than a second threshold value, the movement amount of the first vertex based on the statistical processing for the distance between the three-dimensional coordinates of the first vertex and the three-dimensional coordinates of the second vertex, and the distance between the three-dimensional coordinates of the third vertex and the three-dimensional coordinates of the fourth vertex.

18. The information processing apparatus according to claim 15, wherein the circuitry is further configured to calculate, in a case where the first vertex and a fifth vertex are present within a predetermined distance from a position of an effect in the first frame, a movement destination position of the effect based on the statistical processing for the movement amount of the first vertex and the movement amount of the fifth vertex.

19. An information processing method, executed by at least one processor, the method comprising:

calculating a movement amount associated with a first vertex included in a first frame based on statistical processing according to color information associated with the first vertex, color information associated with a second vertex included in a second frame after the first frame, three-dimensional coordinates associated with the first vertex, and three-dimensional coordinates associated with the second vertex; and extracting at least one surface having the three-dimensional coordinates whose distance from the three-dimensional coordinates of the first surface is smaller than a first threshold value, from among a plurality of surfaces included in the second frame.

20. A non-transitory computer-readable storage medium having embodied thereon a program, which when executed by a computer causes the computer to execute a method, the method comprising:

calculating a movement amount associated with a first vertex included in a first frame based on statistical processing according to color information associated with the first vertex, color information associated with a second vertex included in a second frame after the first frame, three-dimensional coordinates associated with the first vertex, and three-dimensional coordinates associated with the second vertex; and extracting at least one surface having the three-dimensional coordinates whose distance from the three-dimensional coordinates of the first surface is smaller than a first threshold value, from among a plurality of surfaces included in the second frame.

* * * * *